United States Patent
Rijavec

(10) Patent No.: US 7,821,689 B2
(45) Date of Patent: Oct. 26, 2010

(54) MAPPING AN INPUT COLOR VALUE IN AN INPUT COLOR SPACE TO AN OUTPUT COLOR VALUE IN AN OUTPUT COLOR SPACE

(75) Inventor: Nenad Rijavec, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 680 days.

(21) Appl. No.: 11/460,597

(22) Filed: Jul. 27, 2006

(65) Prior Publication Data

US 2008/0030786 A1 Feb. 7, 2008

(51) Int. Cl.
*H04N 1/46* (2006.01)
*G06F 7/38* (2006.01)

(52) U.S. Cl. .................. 358/525; 358/529; 358/518; 358/3.23; 382/167; 382/166; 382/162; 708/290

(58) Field of Classification Search ............. 708/290
See application file for complete search history.

(56) References Cited

U.S. PATENT DOCUMENTS

| | | | | | |
|---|---|---|---|---|---|
| 5,241,373 | A | * | 8/1993 | Kanamori et al. | 348/645 |
| 5,331,439 | A | * | 7/1994 | Bachar | 358/500 |
| 5,596,510 | A | * | 1/1997 | Boenke | 358/523 |
| 5,600,764 | A | * | 2/1997 | Kakutani | 345/591 |
| 5,610,732 | A | * | 3/1997 | Komatsu | 358/525 |
| 5,764,795 | A | * | 6/1998 | Takeo et al. | 382/167 |
| 5,786,908 | A | * | 7/1998 | Liang | 358/518 |
| 5,809,181 | A | * | 9/1998 | Metcalfe | 382/276 |
| 5,883,821 | A | * | 3/1999 | Komaki | 708/290 |
| 6,415,065 | B1 | * | 7/2002 | Miyake | 382/300 |
| 6,421,140 | B1 | | 7/2002 | Hui | |
| 6,744,534 | B1 | * | 6/2004 | Balasubramanian et al. | 358/1.9 |

(Continued)

FOREIGN PATENT DOCUMENTS

JP    2003101806 A    4/2003

OTHER PUBLICATIONS

J.Y. Hardeberg, et al., "Color Management for Color Facsimile", [online], 1997, pp. 1-8. [Retrieved on Jun. 24, 2006]. Retrieved from the Internet at <URL: http://www2.hig.no/~jonh/color/C1C1996_faxcolor/faxcolor.html>.

*Primary Examiner*—King Y Poon
*Assistant Examiner*—Vincent R Peren
(74) *Attorney, Agent, or Firm*—Blakely, Sokoloff, Taylor & Zafman LLP

(57) ABSTRACT

A method and system for mapping an input color value in an input color space to an output color value in an output color space comprising a lookup table mapping an input value to an output color value, the lookup table having n number of possible values for a first fixed color component and q number of possible values for a second fixed color component, wherein q and a number m of possible values for t color components in the input color space are less than n. Surrounding input values are determined in the lookup table in a t dimensional space, wherein each surrounding input value has a same value for the fixed color component(s). Surrounding output values to which the surrounding input values map are determined. The determined input and output surrounding values and the input value are used to estimate an output value corresponding to the received input value.

15 Claims, 5 Drawing Sheets

U.S. PATENT DOCUMENTS

| | | |
|---|---|---|
| 7,019,868 B2 | 3/2006 | Chang et al. |
| 7,236,181 B2 * | 6/2007 | Ho et al. ..................... 345/601 |
| 2003/0098986 A1 * | 5/2003 | Pop ........................... 358/1.9 |
| 2003/0164966 A1 * | 9/2003 | Tamagawa .................. 358/1.9 |
| 2004/0056835 A1 | 3/2004 | Curry et al. |
| 2006/0056683 A1 * | 3/2006 | Komatsu .................... 382/162 |

* cited by examiner

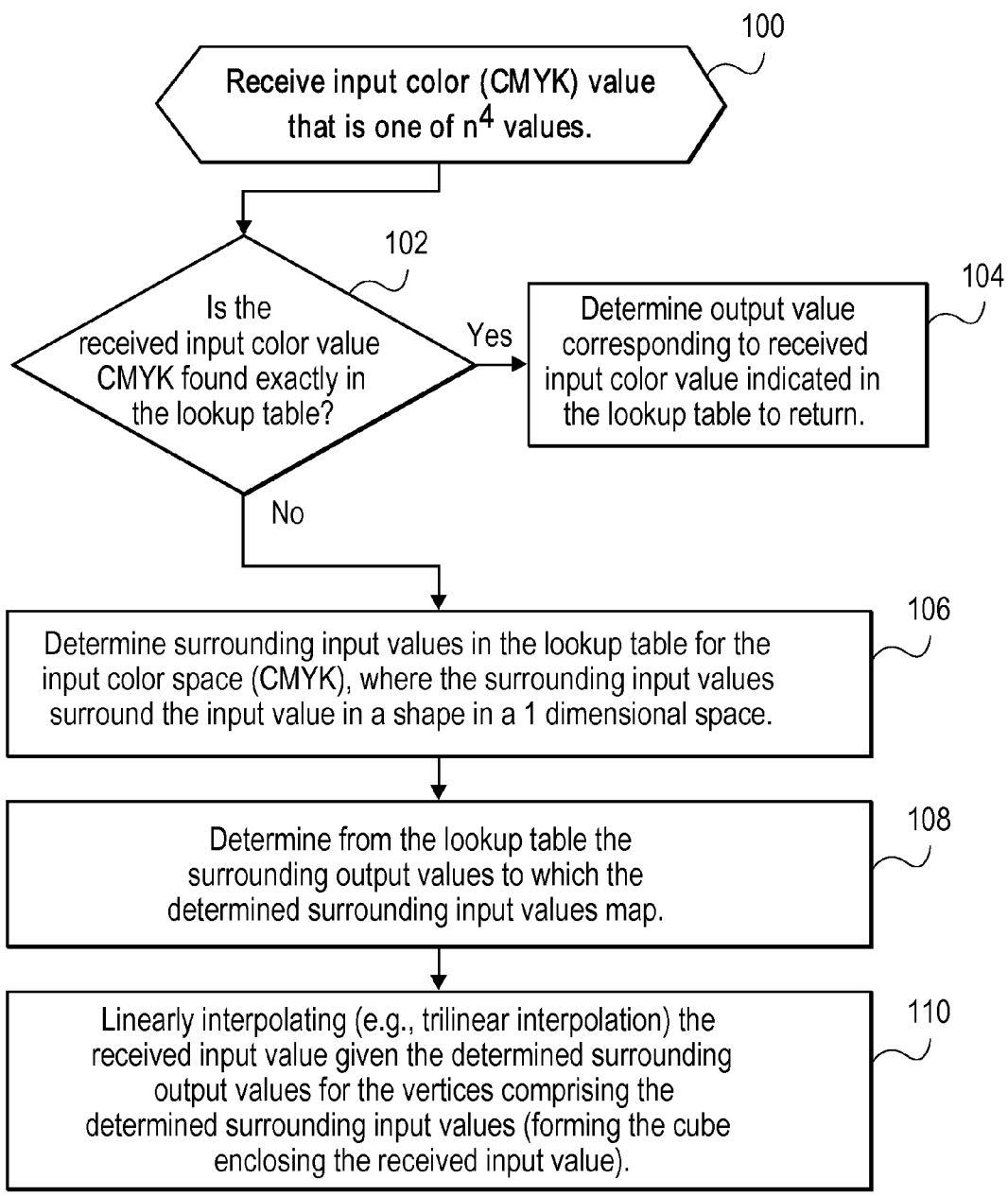

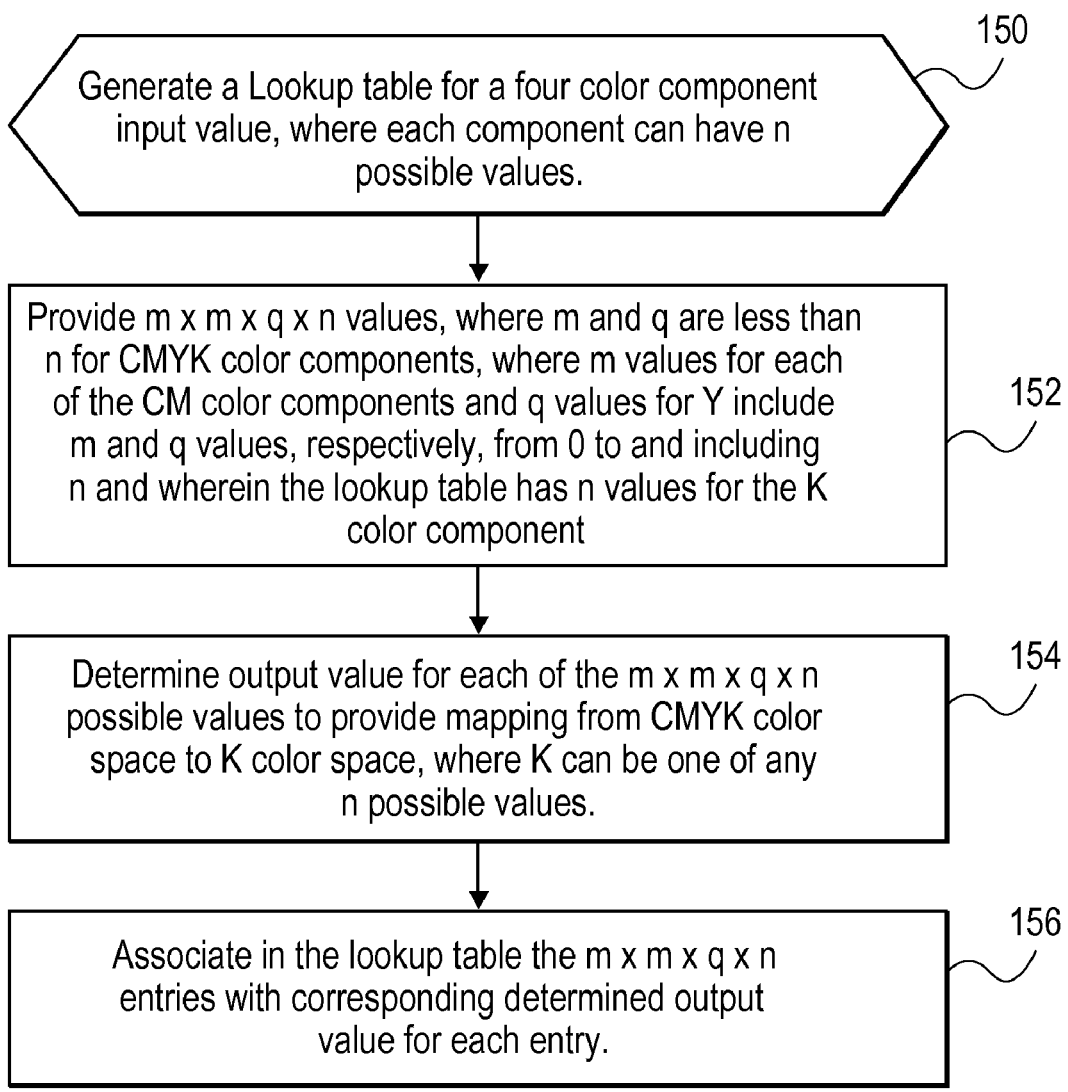

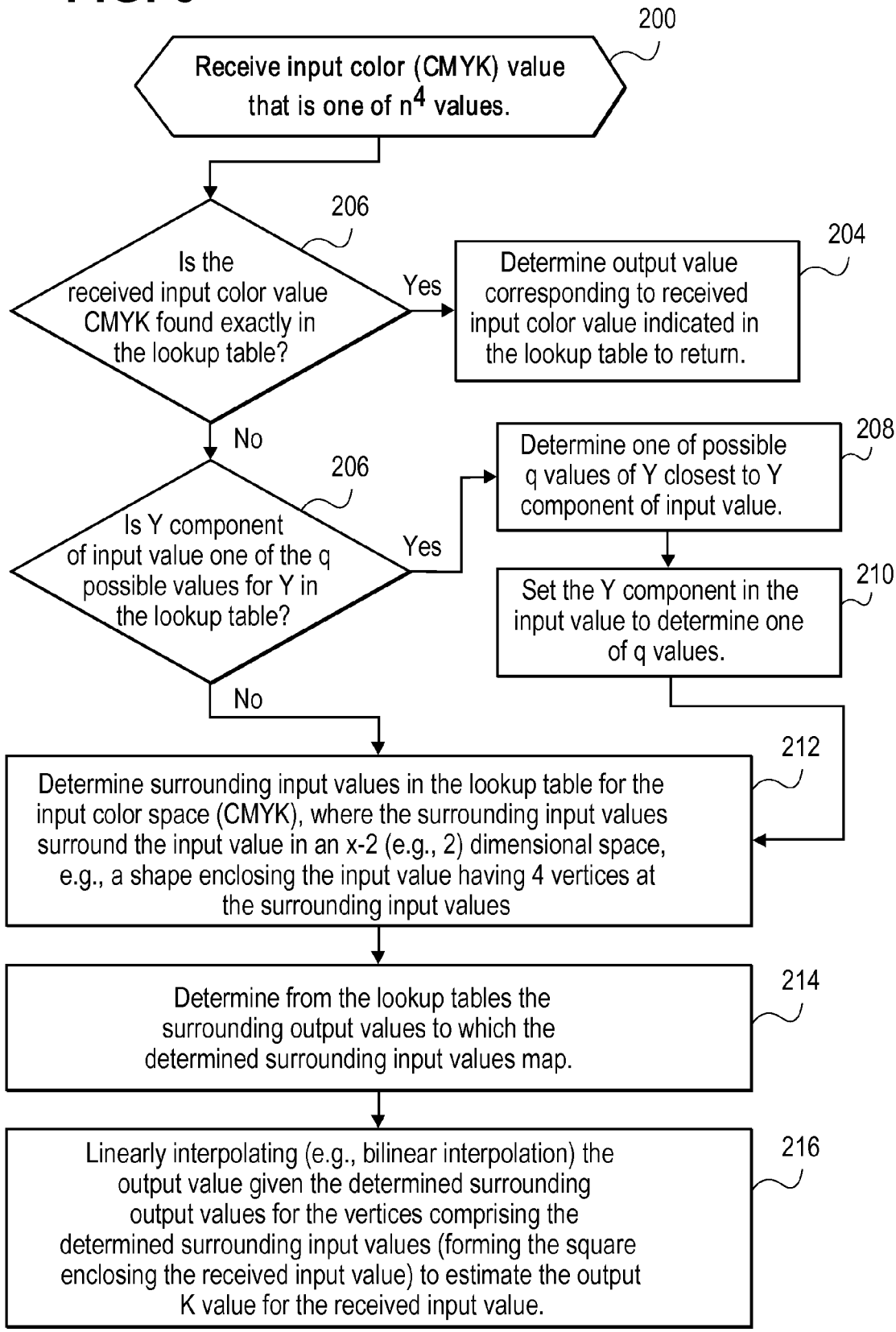

MAPPING AN INPUT COLOR VALUE IN AN INPUT COLOR SPACE TO AN OUTPUT COLOR VALUE IN AN OUTPUT COLOR SPACE

BACKGROUND OF THE INVENTION

1. Field of the Invention

The present invention relates to mapping an input color value in an input color space to an output color value in an output color space.

2. Description of the Related Art

Colors received as input to render at an output device are mapped from one color space to a color space used by the device rendering the input color value. Color conversion is performed if the output device, e.g., video controller, printer, storage, etc. processes data to render in a different format than the input color value. For instance, a color in an RGB (Red, Green and Blue) color space may be mapped to a CMYK (Cyan, Magenta, Yellow and Black), and vice versa. Further, many printers only have black ink, so their output color space comprises halftone color values. If the input color value is in a CMYK color space, then the CMYK color must be converted to the halftone or black (K) color value for rendering by the "black and white" printer.

One technique for converting input values in one color space to an output color space is to use a lookup table that provides a subset of all possible color values and a mapping from each input color value in the subset in the lookup table to a corresponding output color value in the output color space. For instance, if a CMYK color space provided 256 values (e.g., 8 bits) for each color component, then a lookup table including a mapping to an output color space for each possible CMYK value would be considerably large, e.g., $256^4$. To limit the size of the lookup table in the prior art, the lookup table has a mesh of possible values for each color component. For instance, the lookup table may provide m of the n possible values for each color component, where m is less than n. This restricts the size of the lookup table to $m^4$, which may be considerable less than $n^4$. The mesh of values for each color component encompass the range of all possible values for a color component, e.g., including 0 and n. If an input value did not match one of the m values for the input color space in the lookup table, then the system would determine a four dimensional geometric shape having vertices comprising values in the lookup table that enclose the input value. The conversion algorithm then performs quadlinear interpolation on the 16 vertices of this four dimensional shape and their corresponding output values in the output color space to determine the output color space value for the received input value. Quadlinear interpolation is a complex and computationally expensive operation and has a significant negative impact on the performance of the conversion algorithm.

There is a need in the art for improved techniques to map an input color value in an input color space to a value in an output color space.

SUMMARY

Provided are a method, system, and article of manufacture for mapping an input color value in an input color space to an output color value in an output color space. A lookup table in a computer readable medium maps an input value having color components in an input color space to an output color value in an output color space. The lookup table has n number of possible values for a fixed color component in the input color space and less than n number of possible values for t color components in the input color space. An input value in the input color space is received and a determination is made of surrounding input values in the lookup table surrounding the input value in a t dimensional space, wherein each surrounding input value has a same value for the fixed color component. A determination is made from the lookup table of surrounding output values in the output color space to which the determined surrounding input values map. The determined input and output surrounding values and the input value are used to estimate an output value in the output color space for the received input value in the input color space.

BRIEF DESCRIPTION OF THE DRAWINGS

FIGS. 3 and 5 illustrate embodiments of operations to form a lookup table having input values in an input color space that map to output values in an output color space.

FIGS. 4 and 6 illustrate embodiments of operations to use the lookup tables formed according to the operations of FIGS. 3 and 5, respectively, to convert an input value in an input color space to an output value in an output color space.

DETAILED DESCRIPTION

Figure 1:
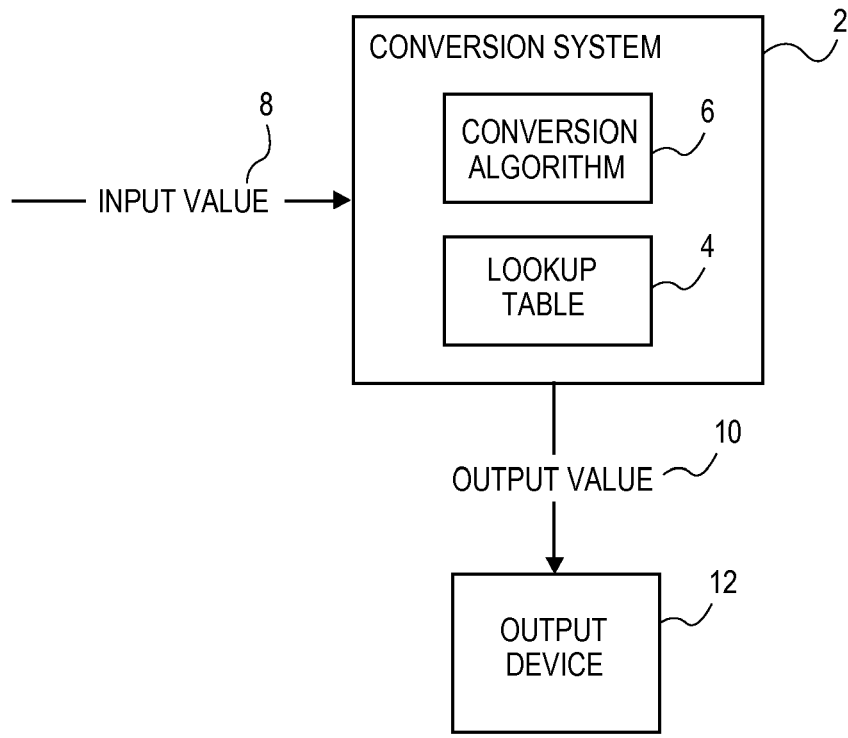
FIG. 1 illustrates an embodiment of a computing environment for color conversion.

FIG. 1 illustrates an embodiment of a computing environment including a conversion system 2 including a lookup table 4 mapping values in an input color space, e.g., CMYK, to a value in an output color space, e.g., K. The conversion system 2 may apply to mappings other than from CMYK to K. A conversion algorithm 6 receives an input value 8 in the input color space and uses the lookup table 4 to estimate an output value 10 in the output color space. The output value 10 may be provided to an output device 12.

The conversion system 2 may be implemented in hardware logic, e.g., an Application Specific Integrated Circuit (ASIC), or in a computer comprising a processor executing code to access the lookup table 4 from a computer readable medium and perform the conversion algorithm 6 operations using the accessed lookup table 4. The conversion system 2 may be part of printer hardware and the output device 12 may comprise the printer engine to render the color or halftone represented by the output value 10. Alternatively, the conversion system 2 may be part of a video controller and the output device 12 may comprise a display monitor to render the output value. Yet further, the output device 12 may comprise a storage device to store the output value for later use or processing. The output device 12 may comprise other suitable output devices known in the art, such as a network adaptor to transmit the output value 10, etc.

The input color space may have x color components and n possible values for each color component thus providing $n^x$ possible values in the x color component color space. The output color space may have y color components and n possible values for each color component. For instance, in an embodiment where the input color space comprises CMYK, i.e., x is four, and there are eight bits for each color component, or 256 possible values for each color component, then the color space has $256^4$ possible values. The output color space may comprise K having n possible values. In an alternative embodiment, the input color space may have a different number of possible values for the different color components.

Figure 2:
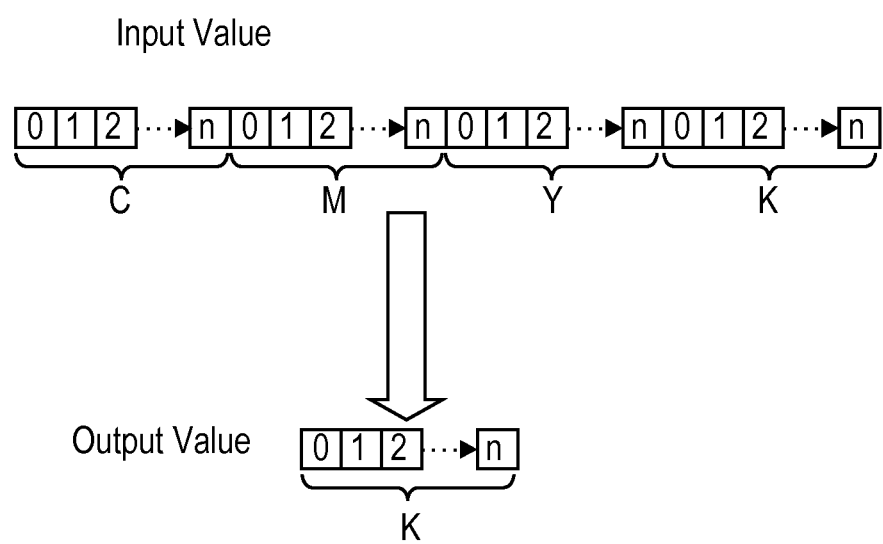
FIG. 2 illustrates an embodiment of components of an input value that map to an output value.

FIG. 2 illustrates the input value having four color components (CMYK), each having n possible values. For instance, if each color component has 8 bits, then n is 256 (e.g., $2^8$) possible values for each color component. In FIG. 2, the output value 10 comprises a single color component K also having n possible values. In an alternative embodiment, the input color space may have a different number of possible values for the different color components. Further, although FIG. 2 shows the output value having the same number of bits as one color component in the input value (e.g., "n"), the color component(s) in the output color space may have a different number of possible values than the possible values for the color components in the input color space, i.e., the bits used to express the output value may differ than the number of bits used to express one color component of the input value.

Figure 3:
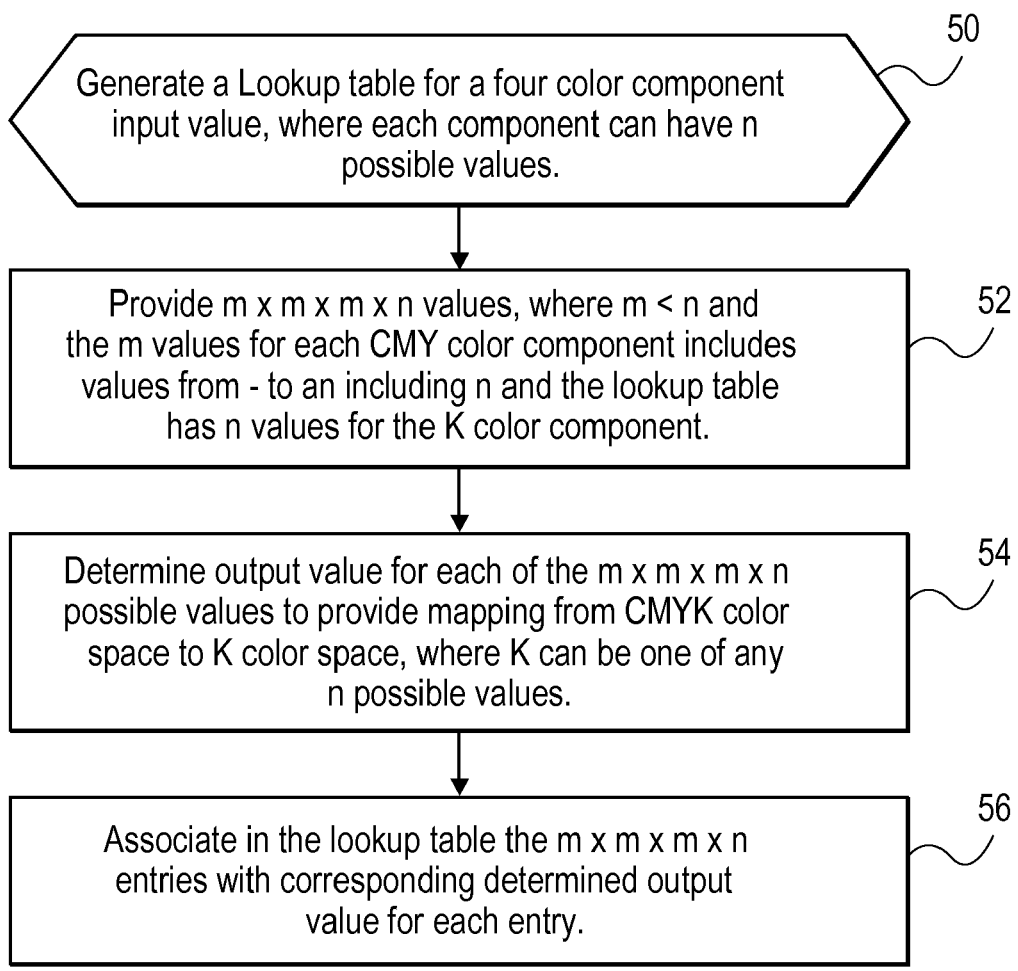

FIG. 3 illustrates an embodiment of operations performed to generate an embodiment of the lookup table 4. In FIG. 3, the developer is creating a lookup table 4 for a four color component input value (e.g., CMYK), where each component can have n (e.g., 256) possible values. A CMYK color space where each color component has 256 possible values would have approximately 4.29 billion values. To reduce the size of the lookup table 4, the developer may consider that certain color components have a greater impact on the output value 10. For instance it is known in the art that changes in K (black) for a CMYK color value have the greatest effect on the output value when converting to a K color space. Thus, to provide a greater weighting to K in a mesh where less than all values are used for certain of the color components, the developer may provide all or most of the possible values of K in the lookup table, e.g., n or 256, while providing fewer possible values for the other color components that have less of an impact on the output value. In such case, the developer generates (at block 52) a lookup table 4 having m×m×m×n values, where m<n. In embodiments where a mesh is used for the CMY color components to interpolate on CMY, leaving K fixed, the m values for each of the CMY color components include m values including 0 and n.

In one embodiment, the developer may provide m possible values for each of the CMY color components, where m is substantially less than n. For instance, m may comprise 9 values for each of the CMY color components that span the range of all possible values for a color component, i.e., the m color values include 0 and the highest possible value for that color component, e.g., n. For instance, the m color values may comprise every (n/m)th value between and including 0 and n. In this way, the number of values for the lookup table 4 forms a mesh of values that are substantially less than the total number of possible values for the color components in the input color space. For instance, if m is 9 and n is 256, then the lookup table requires 9×9×9×256 (6912 values), which is substantially less than $256^4$.

The developer may empirically determine (at block 54) the output K value for each of the m.times.m.times.m.times.n possible values in the lookup table 4 to provide a mapping from the input color space, e.g., the CMYK color space, to the output color space, e.g., the K color space, where K can be one of any n possible values. The developer then associates (at block 56) the m.times.m.times.m.times.n entries in the lookup table 4 with the corresponding determined output value for each entry.

FIG. 4 illustrates an embodiment of operations performed by the conversion algorithm 6 to use the lookup table 4 generated according to the logic of FIG. 3 to map an input value 8 to an output value 10. Upon receiving (at block 100) an input value that is one of the possible values in the color space, e.g., one of the $n^4$ values, the conversion algorithm 6 determines (at block 102) whether the received input color value 8 (e.g., CMYK) is found exactly in the lookup table 4 as an entry. If so, then the conversion algorithm 6 determines (at block 104) the output value corresponding to the received input color value 8 indicted in the lookup table 4.

If there is no exact matching value in the lookup table 4 for the received input value 8, then the conversion algorithm determines (at block 106) the surrounding input values in the lookup table 4 for the input color space (e.g., CMYK), were the surrounding input values surround the input value in a shape in a three dimensional space. For instance, for the embodiment where there are m values for the CMY color components, the surrounding input values may comprise values in the lookup table 4 that comprise vertices of a cube enclosing the input value. If the input color space includes more or less than four color components, then the shape enclosing the input value would be in a t dimensional space, such that interpolation is performed with respect to t of the color components, e.g., CMY. The conversion algorithm 6 further determines (at block 108) from the lookup table 4 the output values 10 in the output color space (referred to as surrounding output values) to which the determined surrounding input values 8 map.

The conversion algorithm 6 performs (at block 110) interpolation or a regression analysis to interpolate the input value 8 to an output value 10 given the surrounding output values at the vertices at the corresponding surrounding input values, where the surrounding input values comprise vertices that form a t-dimensional shape enclosing the received input value. For instance, in an embodiment where interpolation is performed for the CMY color components, there are eight surrounding input values comprising vertices of a cube enclosing the received input value. In such case, trilinear interpolation may be used to interpolate the received input value 8 to an output value 10 given the surrounding output values at the eight vertices comprising the corresponding surrounding input values.

FIG. 5 illustrates an alternative embodiment for generating a lookup table 4 for an input color space, such as a four color component space, where each color component has n possible values. In response to initiating the operations to generate a lookup table (at block 150), the developer provides (at block 152) m×m×q×n values, where m and q are less than n. Further, the developer would provide a mesh of values for each color component including 0 and the greatest possible value for the color component, e.g., n. The developer may decide to provide q values in the lookup table 4 for the color component having the least effect on the value in the output color space, where q is less than m and n. For instance, for a CMYK to K color conversion, the Y component typically has the least effect on the corresponding output value in the K output color space. In such case, the developer would provide fewer values for the Y color component and provide all or most of the possible n values for K because K has the greatest effect on the corresponding output value in the K color space. In one embodiment, the q values for the Y component (having the least effect on the output value) may comprise averages of the possible values for the Y component. The developer further determines (at block 154) an output value for each of the m×m×q×n possible values to provide a mapping from the input color space to the output color space. The determination of an output value corresponding to a value in the input color space included in the lookup table 4 may be made by empirical determination. The developer then associates (at block 156) the m×m×q×n entries provided in the lookup table 4 with their corresponding determined output values.

FIG. 6 illustrates an alternative embodiment of operations performed by the conversion algorithm 6 to use the lookup table 4 generated according to the operations of FIG. 5 to map an input value 8 to an output value 10. Upon receiving (at block 200) an input value that is one of the possible values in the input color space, e.g., one of the $n^4$ values, the conversion algorithm 6 determines (at block 202) whether the received input color value 8 (e.g., CMYK) is found exactly in the lookup table 4 as an entry. If so, then the conversion algorithm 6 determines (at block 204) the output value 10 corresponding to the received input color value 8 indicted in the lookup table 4.

If (at block 202) there is no exact match for the input value 8 in the lookup table 4, then the conversion algorithm 6 determines (at block 206) whether the Y component, which has the least effect on the output value 10 in the K color space, is one of the q possible values for Y provided in the lookup table 4. If not, then the conversion algorithm 6 determines (at block 208) one of the possible q values of Y closest to the Y component in the input value 8 and sets (at block 210) the Y component in the input value 8 to the determined closest one of q values provided for Y in the lookup table 4. If (at block 206) the Y component value is equal to one of the q possible values in the lookup table 4 (from the yes branch of block 206) or after setting the Y component in the input value 8 to one of the q possible values (at block 210), the conversion algorithm 6 determines (at block 212) the surrounding input values in the lookup table 4 for the input color space (CMYK), where the surrounding input values surround the input value in an n−2 (e.g., 2) dimensional space, e.g., a shape enclosing the input value having four vertices at the surrounding input values. For instance, for the embodiment where there are m values for the CM color components, the surrounding input values may comprise values in the lookup table 4 that comprise vertices of a square enclosing the input value 8. If the input color space includes more or less than 4 color components, then the shape enclosing the input value would be in a t-dimensional space, such that interpolation is performed with respect to t of the color components, e.g., CM, and not with respect to the color components that are fixed, e.g., YK.

The conversion algorithm 6 further determines (at block 214) from the lookup table 4 the output values in the output color space (referred to as surrounding output values) to which the determined surrounding input values map.

The conversion algorithm 6 performs (at block 216) interpolation or a regression analysis to interpolate the input value 8 to an output value 10 given the surrounding output values at the vertices at the corresponding surrounding input values, where the surrounding input values comprise vertices that form a t-dimensional shape enclosing the received input value. For instance, in an embodiment where interpolation is performed for the CM color components, there are four surrounding input values comprising vertices of a square enclosing the received input value. In such case, bilinear interpolation is used to interpolate the received input value to an output value given the surrounding output values at the four vertices comprising the corresponding surrounding input values.

In further embodiments, the lookup table 4 can be reorganized in KYCM order for the embodiments of FIGS. 5 and 6 using bilinear interpolation, so the four nodes needed for each interpolation can be read in two memory reads.

Described embodiments provide techniques for color conversion from an input color space to an output color space, where the input color space has multiple color components. In described embodiments, interpolation is performed with respect to less than all the color components and the color components not involved in the interpolation remain fixed. In certain embodiments, the lookup table may provide all possible values for the input color component having the greatest effect on the output value, e.g., K for a CMYK to K conversion, where interpolation is not performed with respect to the component having the greatest effect on the output value to reduce the number of vertices involved in the interpolation. Additionally, a component having a least effect on the output value may also be fixed to one of a smaller subset of possible values to further reduce the number of vertices involved in the interpolation.

Described embodiments provide techniques to not include certain of the color components in an input color space in the interpolation operation to reduce the number of dimensions and vertices involved in the interpolation operation. Reducing the number of components and vertices involved in the interpolation, i.e., trilinear or bilinear interpolation instead of quadlinear interpolation, substantially reduces the amount of computation needed to map an input color value to an output color value.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Although the described color conversions involved a CMYK to K color conversions, the described embodiments may apply to any other type of color conversion where the input color space has multiple color components, e.g., CMYK, RGB, etc. Moreover, the mesh of values in the lookup table may provide the same or different number of values for the color components involved in the interpolation.

In the described embodiments, the color components that were described as fixed comprised the color component having the greatest effect on the output value, e.g., K for a CMYK to K conversion, and the least effect, e.g., Y. In alternative embodiments, other color components may be fixed which may differ from the color components having the least and greatest effect on the output value.

In described embodiments, the number of possible values for each color component in the input color space was the same, e.g., n. In alternative embodiments, there may be a different number of possible values for each color component in the input color space.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the feature of a device may be alternatively embodied by one or more other devices which are not explicitly described as having such functionality/features. Thus, other embodiments of the present invention need not include the device itself.

The illustrated operations of FIGS. 3, 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a tangible, non-transitory computer readable medium implementing code, wherein the code is enabled to perform operations, the operations comprising:

providing a lookup table to map an input value having color components in an input color space to an output color value in an output color space, wherein the lookup table has n number of possible values for a first fixed color component in the input color space, q number of possible values for a second fixed color component, wherein q and a number of possible values for t color components in the input color space are less than n;

receiving an input value in the input color space;

determining whether an exact match of the input value is found in the lookup table;

determining if the second color component of the input value has one of q values in the lookup table;

setting the second color component of the input value to a closest of the q values in the lookup table if the second color component does not have one of q values;

determining surrounding input values in the lookup table that surround the input value in a t dimensional space if an exact match of the input value is not found in the lookup table, wherein each surrounding input value has a same value for the fixed color component;

determining from the lookup table surrounding output values in the output color space to which the determined surrounding input values map; and using the determined input and output surrounding values and the input value to estimate an output value in the output color space for the received input value in the input color space.

2. The article of manufacture of claim 1, wherein the surrounding input values define a t dimensional shape enclosing the received input value in the t dimensional space, and wherein using the determined input and output surrounding values and the received input value to estimate the output value for the received input value comprises:

performing interpolation in t dimensions on the determined input and output surrounding values to determine an estimated output value for the input value.

3. The article of manufacture of claim 1, wherein the lookup table provides a same number of possible values for each of the t color components and wherein n comprises a total number of possible values for the first fixed color component.

4. The article of manufacture of claim 1, wherein the input color space has more color components than the output color space, wherein each color component in the input color space has n number of possible values, and wherein each color component of the output color space has n number of possible values.

5. The article of manufacture of claim 1, wherein the input color space comprises the color components cyan (C), magenta (M), yellow (Y), and black (K) and wherein the output color space comprises the color component K, wherein the first fixed color component is K, wherein the second fixed color component is Y and wherein the t color components comprise C and M.

6. The article of manufacture of claim 1, wherein the value for the second fixed color component in the determined surrounding input values comprises:

the value for the second fixed color component in the input value if the value for the second fixed color component in the input value equals one of the q possible values for the second fixed color component provided in the lookup table; and one of the q possible values closest to the value for the second fixed color component in the input value if the value for the second fixed color component in the input value does not equal one of the q possible values.

7. A system, comprising:
an integrated circuit including:
a lookup table to map an input value having color components in an input color space to an output color value in an output color space, wherein the lookup table has n number of possible values for a first fixed color component in the input color space, q number of possible values for a second fixed color component, wherein q and a number of possible values for t color components in the input color space are less than n; and a conversion program enabled to cause operations to be performed to:
receive an input value in the input color space;
determining whether an exact match of the input value is found in the lookup table;
determining if the second color component of the input value has one of q values in the lookup table;
setting the second color component of the input value to a closest of the q values in the lookup table if the second color component does not have one of q values;
determining surrounding input values in the lookup table that surround the input value in a t dimensional space if an exact match of the input value is not found in the lookup table, wherein each surrounding input value has a same value for the fixed color component;
determine from the lookup table surrounding output values in the output color space to which the determined surrounding input values map; and
use the determined input and output surrounding values and the input value to estimate an output value in the output color space for the received input value in the input color space.

8. The system of claim 7, wherein the surrounding input values define a t dimensional shape enclosing the received input value in the t dimensional space, and wherein the operation of using the determined input and output surrounding values and the received input value to estimate the output value for the received input value comprises:
performing interpolation in t dimensions on the determined input and output surrounding values to determine an estimated output value for the input value.

9. The system of claim 7, wherein the input color space has more color components than the output color space, wherein each color component in the input color space has n number of possible values, and wherein each color component of the output color space has n number of possible values.

10. The system of claim 7, wherein the input color space comprises the color components cyan (C), magenta (M), yellow (Y), and black (K) and wherein the output color space comprises the color component K, wherein the first fixed color component is K, wherein the second fixed color component is Y and wherein the t color components comprise C and M.

11. The system of claim 10, wherein the lookup table provides q possible values for the second fixed color component, wherein q is less than n.

12. A method, comprising:
providing a lookup table to map an input value having color components in an input color space to an output color value in an output color space, wherein the lookup table has n number of possible values for a first fixed color component in the input color space, q number of possible values for a second fixed color component, wherein q and a number of possible values for t color components in the input color space are less than n;
receiving an input value in the input color space;
determining whether an exact match of the input value is found in the lookup table;
determining if the second color component of the input value has one of q values in the lookup table;
setting the second color component of the input value to a closest of the q values in the lookup table if the second color component does not have one of q values;
determining surrounding input values in the lookup table that surround the input value in a t dimensional space if an exact match of the input value is not found in the lookup table, wherein each surrounding input value has a same value for the fixed color component;
determining from the lookup table surrounding output values in the output color space to which the determined surrounding input values map; and
using the determined input and output surrounding values and the input value to estimate an output value in the output color space for the received input value in the input color space.

13. The method of claim 12, wherein the surrounding input values define a t dimensional shape enclosing the received input value in the t dimensional space, and wherein using the determined input and output surrounding values and the received input value to estimate the output value for the received input value comprises:
performing interpolation in t dimensions on the determined input and output surrounding values to determine an estimated output value for the input value.

14. The method of claim 12, wherein the input color space has more color components than the output color space, wherein each color component in the input color space has n number of possible values, and wherein each color component of the output color space has n number of possible values.

15. The method of claim 12, wherein the input color space comprises the color components cyan (C), magenta (M), yellow (Y), and black (K) and wherein the output color space comprises the color component K, wherein the first fixed color component is K, wherein the second fixed color component is Y and wherein the t color components comprise C and M.

* * * * *